United States Patent [19]

Katz

[11] Patent Number: 4,778,706
[45] Date of Patent: Oct. 18, 1988

[54] COMPOSITE NON-DISTORTABLE NEEDLEPOINT CANVAS

[76] Inventor: Marcella M. Katz, 10573 Le Conte Ave., Los Angeles, Calif. 90024

[21] Appl. No.: 714,128

[22] Filed: Mar. 20, 1985

[51] Int. Cl.$^4$ .............................................. B32B 3/02
[52] U.S. Cl. ................... 428/131; 428/906.6; 428/109; 428/247; 428/255; 112/439
[58] Field of Search ................ 428/131, 89, 110, 111, 428/247, 255, DIG. 90.66; 112/439

[56] References Cited

U.S. PATENT DOCUMENTS

| | | | |
|---|---|---|---|
| 3,762,984 | 10/1973 | Goldbeck | 428/255 X |
| 3,773,606 | 11/1973 | Worcester, Jr. et al. | 428/246 X |
| 3,852,090 | 12/1974 | Leonard et al. | 428/246 |
| 4,110,138 | 8/1978 | Nomura et al. | 428/89 |
| 4,122,227 | 10/1978 | Dean | 428/255 X |
| 4,154,181 | 5/1979 | Massucci et al. | 112/439 X |
| 4,253,383 | 3/1981 | Noe | 428/255 X |
| 4,302,495 | 11/1981 | Marra | 428/255 X |
| 4,328,270 | 5/1982 | Kostovski | 428/255 X |
| 4,348,444 | 9/1982 | Craig | 428/255 X |

*Primary Examiner*—Nancy A. B. Swisher
*Attorney, Agent, or Firm*—Philip D. Junkins

[57] ABSTRACT

A composite laminated, non-distortable needlepoint canvas material comprised of a primary layer of non-elastic, open-mesh woven fabric having a uniform weave pattern of mesh apertures and a relatively thin secondary mesh-stabilizing layer of sheer non-elastic fabric material. The threads of the open-mesh primary layer are bonded to the sheer secondary layer by an interposed adhesive layer with the apertures of the primary layer being functionally free of adhesive and the threads of the primary layer are not susceptible to raveling at the edges of the composite needlepoint material. The sheer fabric secondary layer may be a non-woven, semi-transparent, random spun synthetic fiber material or a sheer closely woven fabric material. The secondary layer is bonded to the primary layer by a liquid adhesive applied to one face of the primary layer before it is compressively interfaced with the secondary layer (with the application of heat) or the secondary layer may itself have adhesive properties. Alternatively, the adhesive material may be applied between the primary and secondary layers as a thin sheer intermediate layer of non-woven, random spun thermoplastic fibers capable of softening and fusing when heated and setting as a cured adhesive when cooled.

25 Claims, 1 Drawing Sheet

COMPOSITE NON-DISTORTABLE NEEDLEPOINT CANVAS

BACKGROUND OF THE INVENTION

1. Field of the Invention

The present invention relates to needlepoint canvas and yardage. More particularly, the invention relates to open-mesh woven textile and fabric materials in which the holes or apertures between the natural or synthetic threads of the materials are equal to or larger in size than the threads themselves and are intended to receive needle-directed yarn stitches for the purpose of creating a stitchery design on such textiles and fabrics.

2. Description of the Prior Art

Needlepoint canvas, in its simplest form, is comprised of evenly spaced, durable warp and woof threads woven into a textile in which the holes or apertures between the threads are equal to or larger in size than the threads themselves. The canvas threads are usually composed of cotton or linen fibers, particularly where the gauge of the canvas (number of threads per inch) falls within the popular range of 10 to 18. The threads are composed of a number of fiber strands twisted together and covered with sizing (a stiffening agent such as starch). Fine gauge needlepoint fabrics normally have 18 to 40 threads per inch (sometimes up to 58 threads per inch) and are woven from silk or synthetic fiber threads in addition to cotton and linen fiber threads.

Textile and fabric materials, manufactured for use as needlepoint canvas, are usually woven in 24, 27, 36, 37, 40, 43 and 54 inch widths (sometimes also available in 60 and 72 inch widths) with the edges firmly woven as a narrow "selvage" band, and such materials are sold by their manufacturers in "bolt" (roll) units having a minimum of 5-10 yards of material. Fabrics manufactured for use as petit point canvas may be woven in 22 inch widths. The warp threads lie parallel to the selvage edges and the weft threads lie at right angles thereto.

The principal types of needlepoint canvases in use today are designated "mono-" meaning one thread on each side of each hole or aperture and "double" meaning two threads on each side of each major hole or aperture. There are two basic forms of mono- canvases, i.e., "mono-floating" and "mono-interlock." With mono-floating canvas (see FIG. 1) the warp and weft (woof) threads are merely woven over and under each other whereas with mono-interlock canvas (see FIG. 2) the warp threads (in fact) comprise two smaller (weaker) threads that are knotted or twisted at each over and under crossing of weft threads. Because of the weaving method, mono-floating canvases are subject to greater slippage between threads so that the mesh pattern of the canvas easily becomes distorted, i.e., the holes or apertures become of non-uniform size and configuration with repeated folding and needlepoint working of the canvas. After a great deal of handling even the best of canvases become limp. Further, mono-floating canvas pieces (cut from bolt yardage) are greatly subject to raveling (becoming unwoven) at the cut edges. Mono-interlock woven canvas is somewhat less subject to edge raveling. The smaller dual warp threads so weaken the total canvas that heavy sharp sizing starches are used to saturate the threads and provide body to the canvas. The increased quantities of sizing that are used to reinforce the smaller (weaker) warp threads render the canvas holes or apertures harsh and rough and thereby cause substantial needlepoint yarn wear and frequent yarn breakage, both during the needlepoint stitching process and afterwards while the needlepoint piece is in use. In performing needlepoint work, the body starch relaxes and flakes and the canvas itself experiences loss of stiffness and body. Overly stiff canvas becomes overly limp when worked. With the loss of body, mono-interlock canvas shifts and distorts and its weave pattern frequently interlocks the canvas distortions. Mono-interlock woven canvas is thereby more difficult to block or straighten when distorted out of shape through the application of needlepoint stitchery. Corrective blocking is frequently temporary. Thus, the canvas will often creep back into its pre-blocked distorted form and cannot be permanently blocked even by professional blockers.

Double thread needlepoint canvas (also referred to as "Duo" or "Penelope") is woven with the warp and woof threads that form the principal holes or apertures of the canvas each comprised of a pair of slightly spaced threads (see FIG. 3) which form small apertures. This weave of needlepoint canvas is useful when it is desired to use half stitches or where petit point stitches (small) and gross point stitches (large) are to be worked on the same canvas. In this instance, the canvas' woven structure permits shifting of warp and woof dual threads to make large and small aperture sizes. In other instances, as with the classic Aubusson tapestry stitch, the two vertical threads are not split to achieve a fine textured stitch but is rendered on double thread canvas without the tedium of separating the double vertical threads.

From time to time other forms of needlepoint canvas have been manufactured. For example, molded plastic, large gauge (4–10) mesh sheets, with a surface texture simulating the warp and woof thread configuration of woven needlepoint canvas, have been made. Such molded mesh sheets have been found to be stiff as a stitchwork material and thus have not found use for upholstery or traditional fine needlepoint applications.

Mono-floating and mono-interlock needlepoint canvases have continued to be used for most stitchery applications despite their many shortcomings and the problems they create for the needlepoint artisan. The principal shortcomings and problems include (as previously noted) edge raveling, canvas distortion, aperture irregularity and roughness, and thread shifting. Needlepoint pieces greatly vary in size from bolt width (24, 36, 40, 54 and 72 inches) and yardage lengths to small pieces (cut from bolt full width yardage) measuring only inches per side. Great care must be taken when cutting bolt or yardage canvas into smaller popular use size canvas pieces to make certain that each cutting course or line follows a single line of canvas holes or apertures, i.e., between warp and woof threads, so that edge raveling is minimized. Wide widths of canvas are particularly difficult to cross-cut following an exact minute woof line. In most cases the needlepoint artisan cuts the canvas so that a wide border area (outside of the proposed stitchery design and background area) is provided and a band of the boarder canvas is folded under and bound, taped and/or cemented with adhesive to the underside of the canvas to prevent raw edge raveling. In other cases the canvas is held along its edge portions in a bulky and rigid frame which is often awkward or inconvenient to carry from place to place where the artisan desires to perform needlework. For any shaping or reshaping of the canvas after the application of needlepoint stitchery, the burdened warp and woof threads of the canvas must be machine stitched to hold the worked threads in place and provide needlepoint stitch retention. Thereafter, the wide safety border area or band of canvas must be attended to. Edge raveling becomes an even greater problem when the ultimate shape of the needlepoint piece is not rectangular with its edges not in parallel with warp and woof threads.

Canvas distortion, stretching, sagging, extension and creep constitute major problems to persons performing needlepoint stitchery. If one closely observes needlework canvas as needlepoint stitchery is applied, it becomes obvious that the vertical and horizontal forces applied to the canvas threads (defining each aperture in the canvas) by the yarn-guiding needle and the yarn itself (as they pass through such apertures) are unequal. The absence of highly controlled and uniform yarn pull results in a wide variance of forces applied to the canvas threads and causes shifting, crunching or tauting of the threads and causes differences in aperture size and configuration throughout the canvas with the ultimate result that the canvas and stitchery design becomes distorted. Although canvas manufacturers have attempted to reduce the distortion problem through the weaving of mono-interlock canvases and by the application of sizing (stiffening) agents to the canvas threads, the problem remains. Distortion correction, after completion of the needlework piece, by straightening or "blocking" the base canvas (and the needlework it bears) must overcome many built-in failure factors. Blocking, a somewhat costly procedure, involves the stretching and straightening of the needlework to its pre-stretched size and shape. Even when the needlework piece is affixed at its edges after blocking, the blocked piece may creep back to a distorted shape over a period of time, and further blockings (if attempted) will yield unpredictable results.

It is an object of the present invention to provide an improved needlepoint canvas material which is non-distortable and dimensionally stable throughout the application thereto of needlepoint stitchery.

It is a further object of the invention to provide an improved needlepoint canvas material that is dimensionally stable yet displays adequate flexibility and manipulatability for the needlepoint artisan.

It is still a further object of the invention to provide an improved needlepoint canvas material that maintains its structural integrity with respect to uniformity of aperture size and configuration throughout its manipulation during the application of needlepoint stitchery.

It is another object of the invention to provide an improved needlepoint canvas material that does not ravel at its edge during its manipulation and the application of needlepoint stitchery thereto.

It is still another object of the invention to provide an improved needlepoint canvas material which does not require blocking after the completion of the needlepoint work.

It is yet another object of the invention to provide an improved needlepoint canvas material which may be cut into non-rectangular regular shapes and an unlimited variety of irregular shapes and sizes without concern for edge raveling and with the material capable of accepting needlepoint stitchery to the last complete holes or apertures and thus to the edges thereof.

Another object of the invention is to provide an improved needlepoint canvas material which, although manufactured in typical bolt widths, may be machine cut into relatively long, narrow, selvage-free strips for spooling and marketing without concern for edge raveling during its manipulation and the application of needlepoint stitchery.

Still another object of the invention is to provide an improved needlepoint canvas material which may be cut into shapes that are free-standing and thus may have needlepoint stitchery applied as a total design to the shapes without requiring surrounding and tedious background stitchery.

It is still another object of the invention to provide an improved needlepoint canvas material that readily accepts and fully supports heavily detailed needlepoint or mixed media cross-stitch designs and patterns regardless of the open aperture mesh gauge of the material.

A still further object of the invention is to provide a unique method for producing a needlepoint canvas material which is non-distortable and dimensionally stable, which does not require the application of excessive, yarn-damaging sizing compounds, which does not ravel at its edges during its manipulation and the application of needlepoint stitchery, and which does not require blocking after the completion of the needlework.

Other objects and advantages of the invention will be apparent from the following detailed description of the invention, taken together with the accompanying drawings.

SUMMARY OF THE INVENTION

The present invention relates to an improved needlepoint canvas material and the methodology for producing such material. The needlepoint canvas material of the invention is a flexible, non-distortable composite laminated sheet material comprised of a primary layer of non-elastic, open-mesh woven needlepoint fabric which has bonded to one of its faces a relatively thin, non-elastic secondary mesh-stabilizer layer of sheet fabric. The primary layer is preferably a mono-floating or mono-interlock needlepoint canvas material having uniformly sized and spaced mesh holes or apertures between the threads of the canvas with such apertures being equal to or larger in size than the threads themselves. Alternatively, the primary layer may be double thread needlepoint canvas material having principal holes or apertures and smaller holes or apertures. The sheer fabric secondary layer is preferably a non-woven, semi-transparent, random-spun synthetic fiber material or a sheer closely woven fabric material. The sheer fabric secondary layer is bonded to the open-mesh primary layer by a synthetic adhesive material which may be applied as a liquid thermoplastic adhesive to one face of the primary layer before it is compressively interfaced with the sheer secondary layer (with the application of heat) or the secondary layer may have built in adhesive properties and immediately applied under heat and pressure to the primary layer. Alternatively, the adhesive material may be applied between the primary and secondary layers as an intermediate layer of thermoplastic adhesive material before the application of pressure and heat to the primary and secondary layers. Where the synthetic adhesive material takes the form of an intermediate layer of thermoplastic adhesive material, such layer is preferably a thin fabric material made of non-woven, random-spun thermoplastic fibers with such material being capable of softening and fusing when heated and setting as a cured adhesive layer when cooled.

The needlepoint canvas material of the invention, as a composite laminated sheet material having a primary layer of well accepted needlepoint canvas and a bonded secondary mesh stabilizing layer of sheer fabric, provides the needlepoint artisan with an improved needlepoint canvas material which is non-distortable because the warp and woof threads of the layer are held in proper alignment and spacing through their bonding to the secondary mesh-stabilizing layer. Further, with the threads of the primary layer material bonded at one of its faces to the sheer secondary layer, the threads do not ravel at the edges of the canvas. The secondary layer is of such a sheerness that it is semi-transparent so that the holes or apertures of the canvas layer remain distinct to the needlepoint artisan and the secondary layer is relatively thin so that it is easily penetrated by the yarn-bearing stitchery needle.

PREFERRED EMBODIMENTS OF THE INVENTION

Figure 1:
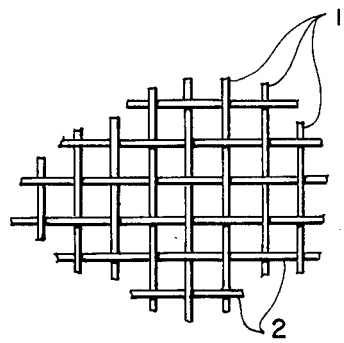
FIG. 1 is an enlarged top plan view of a segment of a typical piece of mono-floating thread woven needlepoint canvas.
Figure 2:
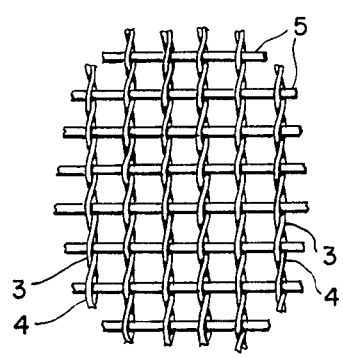
FIG. 2 is an enlarged top plan view of a segment of a typical piece of mono-interlock thread woven needlepoint canvas.
Figure 3:
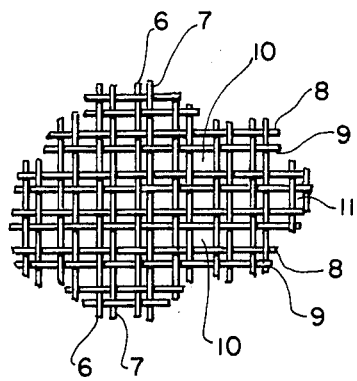
FIG. 3 is an enlarged top plan view of a segment of a typical piece of double thread woven needlepoint canvas.

Referring initially to FIGS. 1, 2 and 3 of the drawing, there is shown examples of the thread and weave structure of three of the most common needlepoint canvas types, i.e., mono-floating thread canvas (FIG. 1), mono-interlock thread canvas (FIG. 2) and double thread canvas (FIG. 3). In the mono-floating canvas the warp threads 1 and the weft (woof) threads 2 are merely woven over and under each other. In the mono-interlock canvas the warp threads (in fact) comprise two smaller (weaker) threads 3 and 4 that are twisted at each over and under crossing of the weft threads 5. Double thread needlepoint canvas (FIG. 3) is woven with pairs of warp threads 6 and 7 and pairs of weft threads 8 and 9 with each pair of threads defining with other pairs of threads principal apertures 10 and with the threads of each pair of threads defining with the threads of other pairs of threads small apertures 11 of the canvas.

Figure 4:
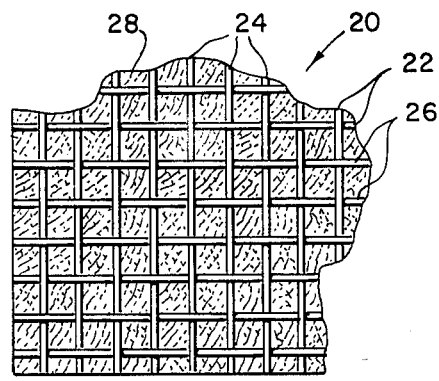
FIG. 4 is an enlarged top plan view of a composite laminated piece of the needlepoint canvas material of the present invention with the sheer non-woven, random-spun synthetic fiber secondary layer affixed to the underside of the open-mesh woven canvas primary layer of the composite material.
Figure 5:
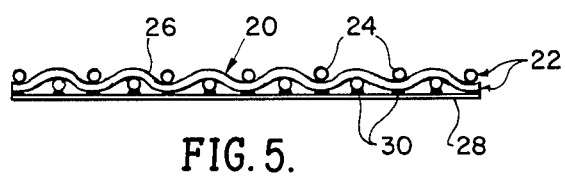
FIG. 5 is an enlarged sectional view of the needlepoint canvas material of FIG. 4 taken along line 5—5 of FIG. 4.

Referring next to FIGS. 4 and 5 of the drawing, the composite laminated needlepoint canvas material 20 of this invention comprises a non-elastic, open-mesh woven needlepoint fabric primary layer 22, comprised of warp threads 24 and weft threads 26, which has bonded to one of its faces a relatively thin, non-elastic, mesh-stabilizing secondary layer of sheer fabric material 28. The adhesive which bonds the secondary layer 28 to the primary layer 22 may be a hot melt, solvent based or aqueous based adhesive. It is applied as a heated viscous coating to the outermost surface points of the warp and weft threads on the interface surface of the primary layer so that bonding of the layers occurs at a uniformly distributed multiplicity of small adhesive deposit points 30 and the apertures of the open-mesh primary layer are maintained functionally free of the adhesive material.

Figure 6:
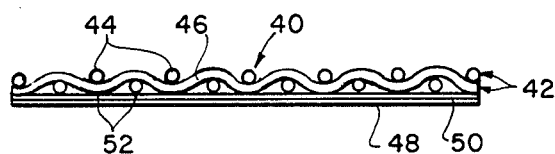
FIG. 6 is an enlarged sectional view of an alternative form of the needlepoint canvas material of the invention.

An alternative composite laminated needlepoint material 40 of this invention is shown in FIG. 6 and comprises a non-elastic, open-mesh woven needlepoint fabric primary layer 42, comprised of warp threads 44 and weft threads 46, which has bonded to one of its faces a relatively thin, non-elastic, mesh-stabilizing secondary layer of sheer fabric material 48. The bond between the open-mesh primary layer 42 and the sheer secondary layer 48 is established by a thin interposed sheer layer 50 of non-woven, random-spun thermoplastic resin fibers which soften with the application of heat to the assembly of layers and fuse the secondary layer to the primary layer at the outermost surface points of the warp and weft threads on the interface surface of the primary layer. The bonding of the layers occurs at a multiplicity of small adhesive contact points 52 and the apertures of the open-mesh primary layer are maintained functionally free of the interposed adhesive layer 50. The interposed bonding layer 50 also integrally bonds the sheer secondary layer 48 into the composite laminated material structure 40.

Figure 7:
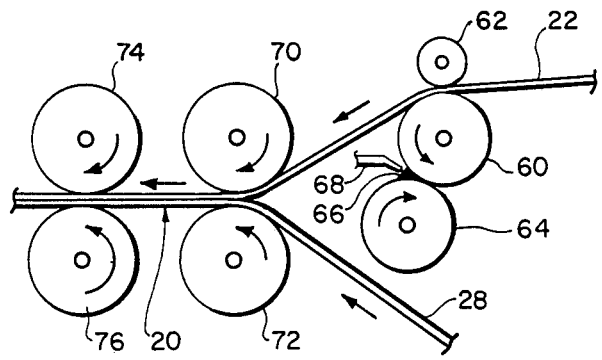
FIG. 7 is a somewhat diagrammatic showing of one method of applying the sheer secondary layer to the open-mesh primary layer to form the composite laminated needlepoint canvas material of the invention.

In FIG. 7 there is illustrated, in somewhat diagramatic fashion, one version of the method of applying the sheer secondary layer to the open-mesh primary layer to form the composite laminated needlepoint canvas material of the invention as shown in FIG. 5. In accordance with the methodology illustrated in FIG. 7 a web of non-elastic, open-mesh woven needlepoint fabric 22 is fed as a primary laminate layer between a heated, etched-surface roll 60 and an idler roll 62 which rotatably holds fabric layer 22 to roll 60. A lower heated roll 64 rotatably interacts with heated roll 60 to calender the laminate bonding adhesive material 66 introduced to such rolls by a suitable feed device 68. A thin heated viscous calendered coating of adhesive material is carried by roll 60 to the laminate interface surface of the open-mesh fabric 22 whereat it is applied to the outermost surface points of the warp and weft threads of such fabric surface in a uniform printed-on pattern of minute adhesive deposit points with the apertures of the open-mesh fabric maintained functionally free of the adhesive material. After the application of adhesive material 66 to the laminate interface surface of the open-mesh fabric primary layer 22, such layer is fed to one or more pairs of heated opposing rotatable pressure rolls 70 and 72 whereat a web of non-elastic, mesh-stabilizing secondary layer of sheer fabric material 28 is interfaced under pressure and precisely controlled heat to primary layer 22 to form the composite laminated needlepoint canvas material 20 of the invention. The laminated canvas material 20 is thereafter fed to one or more additional pairs of opposing rotatable pressure rolls 74 and 76 at ambient temperature whereby the laminate bonding adhesive is cooled to below its fusing temperature.

Figure 8:
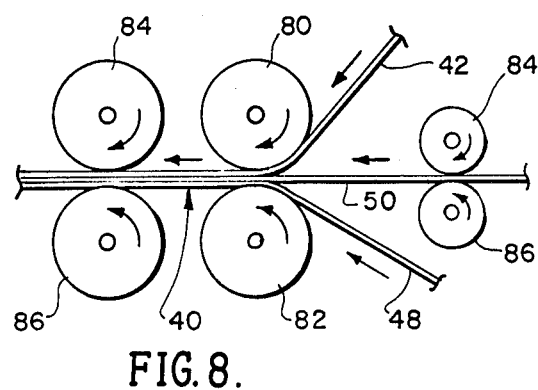
FIG. 8 is a somewhat diagrammatic showing of a second method of applying the sheer secondary layer to the open-mesh primary layer to form the composite laminated needlepoint canvas material of the invention.

In FIG. 8 there is illustrated, in somewhat diagramatic fashion, another version of the method of applying the sheer secondary layer to the open-mesh primary layer to form the composite laminated needlepoint canvas material of the invention as shown in FIG. 6. In accordance with the methodology illustrated in FIG. 8 a web of non-elastic, open-mesh woven needlepoint fabric 42 is fed as a primary laminate layer between heated opposing rotatable pressure rolls 80 and 82. Also fed to heated pressure rolls 80 and 82 is a web of non-elastic, mesh-stabilizing sheer fabric material 48 as the secondary layer of the composite material and a web of non-woven, random-spun thermoplastic resin fibers comprising an interposed sheer adhesive layer 50 which has been pre-heated by passage between opposing rotatable heated rolls 84 and 86. The primary laminate layer of open-mesh fabric 42, secondary mesh-stabilizing laminate layer 48 and interposed adhesive layer 50 passing in interfacing relationship between pressure rolls 80 and 82 are heated to a temperature above the fusing point temperature of the interposed adhesive layer 50 to form the composite laminated needlepoint canvas material 40 of the invention. The hot composite laminated material is thereafter fed through one or more pairs of opposing rotatable pressure rolls 84 and 86 at ambient temperature whereby the interposed laminate bonding layer 50 is cooled below its fusing temperature. As previously indicated, the sheer secondary layer itself may have built in adhesive properties and immediately applied under heat and pressure to the primary layer.

Where the composite laminated needlepoint canvas material of the invention takes the laminate form as shown in FIG. 5 and is fabricated in accordance with the methodology illustrated in FIG. 7, the primary laminate layer 20 may be comprised of any suitable non-elastic, open-mesh woven needlepoint fabric having a uniform pattern of mesh apertures between the threads of the fabric with the apertures being equal to or larger in size than the threads forming the fabric. The sheer fabric secondary laminate layer 28 is preferably a non-woven, semi-transparent, random-spun synthetic fiber material or a sheer closely woven fabric material. Non-woven, synthetic fiber materials of the type that may be utilized include semi-transparent, random-spun polyesters and polyamides having a material weight of 0.25 to 0.80 ounce or more per square yard. The weight of the secondary layer should increase as the size of the apertures of the primary layer increase. As previously mentioned, the adhesive which bonds the secondary layer 28 to the primary layer 22 may be a hot melt, solvent based or aqueous based adhesive. Thus, latex based and acrylic, polyester and polyamide based adhesives, along with a variety of other thermoplastic synthetic adhesives, are suitable for bonding the secondary layer 28 to the primary layer 22. Depending upon the particular adhesive, the bonding temperature will be within the range of ambient temperature to 450° F. and the viscosity of the adhesive will be within the range of 500 to 5,000 centipoise.

Where the composite laminated needlepoint canvas material of the invention takes the laminate form as shown in FIG. 6 and is fabricated in accordance with the methodology illustrated in FIG. 8, the primary laminate layer 42 may be comprised of any suitable non-elastic, open-mesh woven needlepoint fabric as described above. The sheer fabric secondary layer 48 is also preferably a non-woven, semi-transparent, random-spun synthetic fiber material, as described, or a sheer closely woven fabric material. The interposed bonding layer 50 is preferably a non-woven, semi-transparent, random-spun polyamide thermoplastic fiber material having a material weight of 0.25 to 0.80 ounce per square yard.

The following examples include actual material and structural data respecting composite laminated, non-distortable needlepoint canvas material produced in accordance with the embodiments of the invention.

EXAMPLE I

A composite laminated non-distortable needlepoint canvas material having a mono-floating thread weave was fabricated in accordance with the invention in yardage quantities. The primary layer of the composite material comprised commercially available non-elastic, cotton thread open-mesh, mono-floating weave, 12 gauge needlepoint canvas weighing 5.0 ounces per square yard and having an average thickness of 0.03 inch. The width of the open-mesh canvas, after removing the edge selvage area, was 30.5 inches. Samples of the open-mesh canvas were tested for its tensile strength and measurements of such strength in the "straight-of-the-grain" direction (machine direction parallel to the original selvage areas) averaged 76 pounds per square inch whereas such strength in the "cross grain" direction averaged 69 psi. The sheer secondary layer of the composite comprised commercially available non-elastic, non-woven, semi-transparent, spunbonded polyester synthetic fiber material weighting 0.5 ounce per square yard and cut to the 30.5 inch width of the primary layer. A pre-heated emulsion of thermoplastic based adhesive was utilized to bond the secondary layer to the primary layer. The hot adhesive was initially applied to the outermost surface points of the warp and weft threads on the laminate interface side of the primary layer by an engraved, heated calendering roller. Approximately 0.5 ounce of adhesive was utilized per square yard of the primary layer material. The open-mesh primary layer, with adhesive thereon, was thereafter interfaced with the sheer secondary layer and laminated under pressure by passage through a first pair of opposing heated rolls followed by further pressure rolling with attendant cooling of the composite laminate material to ambient temperature. The composite laminate canvas material (average thickness of 0.034 inch) was lastly edge trimmed to a width of 29.5 inches and bolt spooled. Samples of the composite material were tested for its tensile strength and measurements of such strength in the straight-of-the-grain direction averaged 93 psi whereas such strength in the cross grain direction averaged 72 psi.

EXAMPLE II

A composite non-distortable needlepoint canvas material having a mono-interlock thread weave was fabricated in accordance with the invention in yardage quantities. The primary layer of the composite material comprised commercially available non-elastic, cotton thread open-mesh, mono-interlock weave, 14 gauge needlepoint canvas weighing 4.0 ounces per square yard and having an average thickness of 0.02 inch. The selvage-free width of the canvas was 30.5 inches. Samples of the open-mesh canvas were tested for its tensile strength and measurements of such strength in the straight-of-the-grain direction averaged 58 psi whereas such strength in the cross grain direction averaged 57 psi. The sheer secondary layer of the composite comprised the same spunbonded polyester material as used in the composite material described in Example I and 0.5 ounce of the adhesive of such example was utilized in like fashion to bond the sheer secondary layer to the mono-interlock weave primary layer. The resulting composite laminated canvas material had an average thickness of 0.024 inch and was edge trimmed to a final width of 29.5 inches and bolt spooled. Samples of the composite material were tested for its tensile strength and measurements of such strength in the straight-of-the-grain direction averaged 62 psi whereas such strength in the cross grain direction averaged 59 psi.

EXAMPLE III

A composite laminated non-distortable needlepoint canvas material having a mono-interlock thread weave was fabricated in accordance with the invention in yardage quantities. The primary layer of the composite material comprised the same mono-interlock needlepoint canvas as used in the composite material described in Example II and the sheer secondary layer of the composite comprised the same spunbonded polyester material as described in such example. The adhesive utilized to bond the secondary layer to the primary layer comprised a sheer interposed layer of commercially available non-elastic, non-woven, semi-transparent, spunbonded polyamide synthetic fiber material weighing 0.4 ounce per square yard and cut to 30.5 inch width of the primary and secondary layers. After preheating the spunbonded polyamide material, the open-mesh primary layer, interposed spunbonded polyamide layer and spunbonded polyester layer were interfaced and laminated under pressure by passage through a first pair of opposing heated rolls followed by further pressure rolling with attendant cooling of the composite laminate material to ambient temperature. The composite laminated canvas material had an average thickness of 0.026 inch and was edge trimmed to a final width of 29.5 inches and bolt spooled. Samples of the material exhibited tensile strengths comparable to those of the composite material of Example II.

The unique composite needlepoint canvas material of the above examples were all found to be non-distortable when needlepoint stitchery was applied and the material exhibited no edge raveling when cut into a variety of rectangular and irregular shapes. Further, the materials were found to be easily machine cut into narrow ravel-free strips.

From the foregoing description of the present invention, examples of articles of manufacture embodying the invention and the accompanying drawing figures, it will be apparent that there has been disclosed a unique composite laminated needlepoint canvas material. The composite material is non-distortable and dimensionally stable because the warp and weft threads of the primary open-mesh canvas layer are kept in proper alignment by their bonded relationship to the sheer non-elastic mesh-stabilizing secondary layer of fabric material whereby uniformity of the size, alignment and configuration of the apertures to the open-mesh canvas is maintained throughout the material. Although non-distortable and dimensionally stable, the composite material displays appropriate flexibility and manipulatability for the needlepoint artisan. Because of the bonding of the warp and weft threads of the primary open-mesh canvas layer to the mesh-stabilizing secondary layer, the composite canvas material of the invention does not ravel at its edges before, during or after the application of needlepoint stitchery thereto. Further, the unique composite laminated material does not require blocking after the completion of the needlepoint work because the material is substantially non-distortable. The composite material, with needlepoint stitchery applied, is washable and may be cleaned by common dry cleaning chemicals without experiencing harmful effects or shrinkage.

The disclosed improved composite laminated needlepoint canvas material, although produced in bolt quantities of common widths, does not require that the selvage edges of the primary open-mesh canvas layer be retained to inhibit raveling. In fact, the composite material is fabricated utilizing bolt widths of the primary canvas layer from which the salvage areas have been removed. Removal of the selvage edges also eliminates aperture distorts in the area of the selvages. Because the composite material does not ravel, it may be readily cut into an unlimited variety of regular and irregular shapes and sizes with the cut material capable of accepting needlepoint stitchery to the last complete holes or apertures and thus to the edges thereof. In addition, the material may be die cut at the time of its manufacture into popular design shapes or machine cut at such time into relatively long, narrow, selvage-free strips for separate spooling in a wide variety of widths, even widths down to about one inch. Thus, long strips of the material may be spooled in a variety of pre-cut widths for use in making long decorative (sag-free) popular bellpull and tapestry pieces, belts and bands bearing needlepoint stitchery, and the like, without requiring that the needlepoint artisan make long careful cuts by hand along warp or weft threads as with prior needlepoint canvas materials. Further, long strips of the composite needlepoint canvas material may be cut from bolt material along the "straight-of-the-grain" of the material (the so-called north-south direction of the primary layer of open-mesh woven material and the direction parallel to the original selvages of such layer) to obtain strips of maximum strength and free of gravity sag (north-south, wrap-aligned cut strips are classically stronger than east-west, weft-aligned cut strips) without wasting large quantities of the bolt or yardage material along, and adjacent to, the length of the strips. In general, the capability of providing pre-cut, spooled, selvage-free, non-raveling needlepoint canvas material provides the needlepoint artisan with a unique material in sub-bolt, warp-aligned widths that can be quickly, easily and accurately cut east-west (weft aligned) of the material grain.

In addition to unique strip forms fo the composite needlepoint canvas material of the invention, the material may be cut into shapes that are free-standing and thus may have needlepoint stitchery applied as a total design to the edges of the shapes without requiring surrounding and tedious background stitchery. Also, the composite laminated material is better able to support mixed-media craftwork in that, in addition to needlepoint stitchery, it may accept heavy beadwork in adjacent and abutting design areas without causing sagging of the canvas threads and material distortion.

The non-elastic, mesh-stabilizing secondary layer of sheer fabric material, which is bonded to the open-mesh primary layer, provides additional unique features to the composite laminated needlepoint canvas material of the invention. The sheer secondary layer is semi-transparent so that the apertures of the primary open-mesh layer remain distinct to the needlepoint artisan and the secondary layer is extremely thin so that its fibers or threads do not inhibit the manipulation of the yarn-bearing needle through the apertures or the pull of the yarn therethrough.

The sheer secondary layer may be bulk color tinted prior to lamination to provide color contrast with respect to the threads of the primary layer so that the apertures of the primary layer in effect are framed and stand out to promote eye-ease. Light pre-tinting of the secondary layer does not limit its sheerness and semi-transparency. Alternatively, as means for providing color contrast and framing of the apertures, the primary layer of canvas can be pre-colored (coloration of the thread used in weaving the canvas) to contrast with an untinted or contrast tinted sheer secondary layer. In bulk form both the primary layer and the secondary layer can be pre-color matched with the sheerness of the secondary layer providing the desired contrast between such layers.

Most importantly, the presence of the sheer secondary layer provides a full surface effect to both faces of the composite laminated needlepoint material with each face of such material readily accepting fully detailed needlepoint, mixed-media or cross-stitch designs, patterns or decalcomania, regardless of the open aperture mesh gauge of the primary layer. This now provides the needlepoint artisan with two means of framing the apertures of the primary layer, i.e., viewing the apertures from the primary layer side of the composite material and therethrough to the contrasting sheer secondary layer, or viewing the apertures from the secondary layer side through the contrasting sheer secondary layer. Thus, the laminated needlepoint material of the invention, on either or both of its faces, accepts detailed designs applied by paints, marking pens, inks, crayons and a wide variety of iron-on transfer patterns, decalcomania, cross-stitch transfers or dressmaker type carbon sheets and fabric dyes. Such detailed design means and methods of designs make it possible to align to a precise fractional thread count because of the total colorable surface of the secondary layer and the warp and weft threads of the material are held in regular, non-distortable arrangement of apertures of the primary open-mesh layer of the material. The unique material of the invention thereby eliminates the need for the present costly state-of-the-art tedious hand painting of the individual canvas threads to achieve exact design alignment and color coverage. The various color tintings of the sheer secondary layer and coloring of the threads of the primary layer also helps to cost-effectively eliminate canvas "grin through" where the needlepoint yarn does not fully cover the canvas threads and spots of canvas are visible between the stitches. In addition, the sheer secondary layer may be pre-printed with needlework guiding grids and measurement indicia (including numbers, lines and regularly spaced color symbols) so that precise design layouts may be easily made and design enlargement or miniaturization may be accomplished on the fabric itself. Such preprinted integral grids and indicia substantially eliminate the need for separate measuring grids and devices and graphs and charts that require tedius back and forth reference and counting of stitches.

In the specification and drawing figures there has been set forth preferred embodiments of the invention and although specific terms have been employed, they are used in a generic and descriptive sense only and not for purposes of limitation, the scope of the invention being defined in the following claims.

What is claimed is:

1. A composite laminated, non-distortable needlepoint canvas material comprised of:
   (a) a primary layer of non-elastic, open-mesh woven fabric having a uniform gridwork pattern with mesh apertures between the threads of said fabric, said apertures being equal to or larger in size than the threads forming the fabric; and
   (b) a relatively thin secondary mesh-stabilizing layer of sheer non-elastic fabric material coextensive with said primary layer and permanently bonded to the threads thereof by a synthetic resin adhesive, the apertures of said primary layer being functionally free of said adhesive and the gridwork of said primary layer remaining distinct through said secondary layer.

2. A composite laminated, non-distortable needlepoint canvas material as claimed in claim 1 wherein the relatively thin secondary mesh-stabilizing layer of sheer non-elastic fabric material is a non-woven, random-spun synthetic fiber textile material.

3. A composite laminated, non-distortable needlepoint canvas material as claimed in claim 2 wherein the non-woven, random-spun synthetic fiber textile material is made from synthetic resins selected from the group consisting of polyamides and polyesters.

4. A composite laminated, non-distortable needlepoint canvas material as claimed in claim 1 wherein the relatively thin secondary mesh-stabilizing layer of sheer non-elastic fabric material is a closely woven textile material.

5. A composite laminated, non-distortable needlepoint canvas material as claimed in claim 1 wherein the primary layer of non-elastic, open-mesh woven fabric is a mono-floating thread woven canvas material having 4–58 gauge thread spacing.

6. A composite laminated, non-distortable needlepoint canvas material as claimed in claim 1 wherein the primary layer of non-elastic, open-mesh woven fabric is a mono-interlock thread woven canvas material having 4–40 gauge thread spacing.

7. A composite laminated, non-distortable needlepoint canvas material as claimed in claim 1 wherein the primary layer of non-elastic, open-mesh woven fabric is a double thread woven canvas material having 4–40 gauge thread spacing.

8. A composite laminated, non-distortable needlepoint canvas material as claimed in claim 1 wherein the synthetic resin adhesive bonding the secondary layer of sheet fabric material to the primary layer of open-mesh woven material is selected from the group comprising hot melt, solvent based and aqueous based thermoplastic adhesives.

9. A composite laminated, non-distortable needlepoint canvas material as claimed in claim 1 wherein the synthetic resin adhesive bonding the secondary layer of sheer fabric material to the primary layer of open-mesh woven material is selected from the group comprising latex based, acrylic based, polyester based, polyamide based and vinyl based thermoplastic adhesives.

10. A composite laminated, non-distortable needlepoint canvas material as claimed in claim 1 wherein the synthetic resin adhesive bonding the secondary layer of sheer fabric material to the primary layer of open-mesh woven material is an interposed layer of non-woven, random-spun layer of thermoplastic fibers.

11. A composite laminated, non-distortable needlepoint canvas material as claimed in claim 1 wherein the relatively thin secondary mesh-stabilizing layer of sheer non-elastic fabric material presents an outer surface adaptable for receiving needlepoint designs and patterns in alignment with the mesh apertures of the primary layer of non-elastic, open-mesh woven fabric.

12. A composite laminated, non-distortable needlepoint canvas material as claimed in claim 1 wherein the relatively thin secondary mesh-stabilizing layer of sheer non-elastic fabric material presents an inner surface through the mesh apertures of the primary layer adaptable with the threads of the primary layer for receiving needlepoint designs and patterns in alignment with the mesh apertures of the primary layer.

13. A composite laminated, non-distortable needlepoint canvas material as claimed in claim 1 wherein said composite material is initially fabricated in bolt widths which may thereafter be cut into relatively long, narrow selvage-free strips for spooling without edge raveling.

14. A composite laminated, non-distortable needlepoint canvas material as claimed in claim 1 wherein said composite canvas material is initially fabricated in bolts widths which may thereafter be cut into shapes that are free-standing and not subject to edge raveling and thus may have needlepoint stitchery applied as a total design to the full apertures at the edges of said shapes.

15. A composite laminated, non-distortable needlepoint canvas material as claimed in claim 1 wherein said composite canvas material is washable and is cleanable with common dry cleaning chemicals.

16. A composite laminated, non-distortable needlepoint canvas material comprised of:
(a) a primary layer of woven non-elastic, open-mesh, selvage-free fabric material having a uniform gridwork pattern with mesh apertures between the warp and weft threads of said fabric material, said apertures being equal to or larger in size than the threads forming the fabric material; and
(b) a relatively thin secondary mesh-stabilizing layer of sheer non-elastic fabric material coextensive with said primary layer and permanently bonded to the warp and weft threads thereof by a synthetic thermoplastic resin adhesive, the apertures of said primary layer being functionally free of said adhesive and the threads and gridwork pattern of said primary layer remaining distinct through said secondary layer and being unsusceptible to raveling at the edges of said composite needlepoint canvas material.

17. A composite laminated, non-distortable needlepoint canvas material as claimed in claim 16 wherein the primary layer of non-elastic, open-mesh woven fabric is a fabric selected from the group comprising mono-floating, mono-interlock and double thread woven canvas material.

18. A composite laminated, non-distortable needlepoint canvas material as claimed in claim 16 wherein the primary layer of non-elastic, open-mesh woven fabric has a weave pattern of uniformly sized and shaped mesh apertures between the warp and weft threads of said fabric.

19. A composite laminated, non-distortable needlepoint canvas material as claimed in claim 16 wherein the relatively thin secondary mesh-stabilizing layer of sheer non-elastic fabric material is a non-woven, spunbonded synthetic fiber textile material made of synthetic resins selected from the group consisting of polyamides and polyesters.

20. A composite laminated, non-distortable needlepoint canvas material as claimed in claim 16 wherein the relatively thin secondary mesh-stabilizing layer of sheer non-elastic fabric material is a closely woven textile material.

21. A composite laminated, non-distortable needlepoint canvas material as claimed in claim 16 wherein the relatively thin secondary mesh-stabilizing layer of sheer non-elastic fabric material is color tinted to provide a color contrast between the threads of the open-mesh fabric material of said primary layer and thereby provide clear definition to the apertures of said primary layer.

22. A composite laminated, non-distortable needlepoint canvas material as claimed in claim 16 wherein the threads of the open-mesh fabric material of the primary layer are color tinted to provide a color contrast between said threads and the sheer fabric material of said secondary layer and thereby provide clear definition to the apertures of said primary layer.

23. A composite laminated, non-distortable needlepoint canvas material as claimed in claim 16 wherein the relatively thin secondary mesh-stabilizing layer of sheer non-elastic fabric material is preprinted with guiding grids and measurement indicia for design alignment with the threads and apertures of the open-mesh fabric material of the primary layer.

24. A composite laminated, non-distortable needlepoint canvas material as claimed in claim 16 wherein said composite material is initially fabricated in bolt widths which may thereafter be cut into relatively long, narrow selvage-free strips for spooling.

25. A composite laminated, non-distortable needlepoint canvas material as claimed in claim 16 wherein said composite material is initially fabricated in bolt widths which may thereafter be cut into shapes that are free-standing and thus may have needlepoint stitchery applied to the full apertures at the edges thereof.

* * * * *